US012645281B2

(12) United States Patent
Sayyed et al.

(10) Patent No.: US 12,645,281 B2
(45) Date of Patent: Jun. 2, 2026

(54) LOW-POWER SHOCK EVENT DETECTION IN A HETEROGENEOUS COMPUTING PLATFORM

(71) Applicant: Dell Products L.P., Round Rock, TX (US)

(72) Inventors: Ibrahim Sayyed, Georgetown, TX (US); Adolfo S. Montero, Pflugerville, TX (US); Alan H. Abdelhalim, Pflugerville, TX (US); Shane L. Yarbrough, Tuscola, TX (US)

(73) Assignee: Dell Products L.P., Round Rock, TX (US)

( * ) Notice: Subject to any disclaimer, the term of this patent is extended or adjusted under 35 U.S.C. 154(b) by 125 days.

(21) Appl. No.: 18/626,375

(22) Filed: Apr. 4, 2024

(65) Prior Publication Data

US 2025/0315095 A1    Oct. 9, 2025

(51) Int. Cl.
*G06F 1/3234*    (2019.01)
*G06F 1/26*    (2006.01)
*G06F 1/3206*    (2019.01)

(52) U.S. Cl.
CPC ............ *G06F 1/3243* (2013.01); *G06F 1/266* (2013.01); *G06F 1/3206* (2013.01)

(58) Field of Classification Search
None
See application file for complete search history.

(56) References Cited

U.S. PATENT DOCUMENTS

| | | | |
|---|---|---|---|
| 2008/0320338 A1 * | 12/2008 | Ward | H04L 41/0631 |
| | | | 714/43 |
| 2021/0026539 A1 * | 1/2021 | Sheelvant | G06F 3/0619 |
| 2021/0373642 A1 * | 12/2021 | Wang | G06F 9/4411 |
| 2022/0200298 A1 * | 6/2022 | Brier | H02J 7/0014 |

* cited by examiner

*Primary Examiner* — Paul Yen
(74) *Attorney, Agent, or Firm* — Fogarty LLP

(57) ABSTRACT

Systems and methods include an Information Handling System (IHS) that is adapted to detect shock and fall events experienced by the IHS, where the events are detected through operations of a BMU (Battery Management Unit) that is directly connect to batteries of the IHS. An Embedded Controller (EC) of the IHS detects a transition by one or more processors of the IHS to a low-power operating state such that processor-based detection procedures are not operational. Upon detecting the transition, the EC transmits a signal to the BMU to initiate shock detection operations. In response to the signal to initiate shock detection, the BMU initiates a connection to one or more inertial sensors of the IHS. The BMU collects shock event data from these inertial sensors while the one or more processors remain in the low-power operating state.

17 Claims, 5 Drawing Sheets

IHS IS INITIALIZED 505

IHS IS FULLY POWERED AND OPERATIONAL 510

CPU-BASED SHOCK DETECTION IS OPERATIONAL 515

EC DETECTS TRANSITION TO A POWER OFF MODE 520

EC INITIATES SIDEBAND CONNECTION WITH BMU 525

EC TRIGGERS SHOCK DETECTION OPERATIONS BY BMU 530

BMU INITIATES SIDEBAND CONNECTION WITH INERTIAL SENSOR(S) 535

BMU INITIATES DATA COLLECTION & REPORTING BY INERTIAL SENSOR(S) 540

BMU ENTERS LOW-POWER STATE AND WAITS FOR WAKE SIGNAL FROM SENSOR ON SIDEBAND CONNECTION 545

EC RECIEVES AND REPORTS STORED SHOCK DATA 575

IHS RESUMES POWERED OPERATIONS 570

BMU STORES RECEIVED SHOCK DATA 565

BMU USES SIDEBAND CONNECTION TO TRANSFER RECORDED SHOCK DATA FROM INERTIAL SENSOR 560

BMU DETECTS WAKE SIGNAL AND INITIATES POWERED OPERATIONS 555

INERTIAL SENSOR DETECTS SHOCK EVENT, RECORDS DATA, AND TRANSMITS WAKE SIGNAL 550

500

100

200

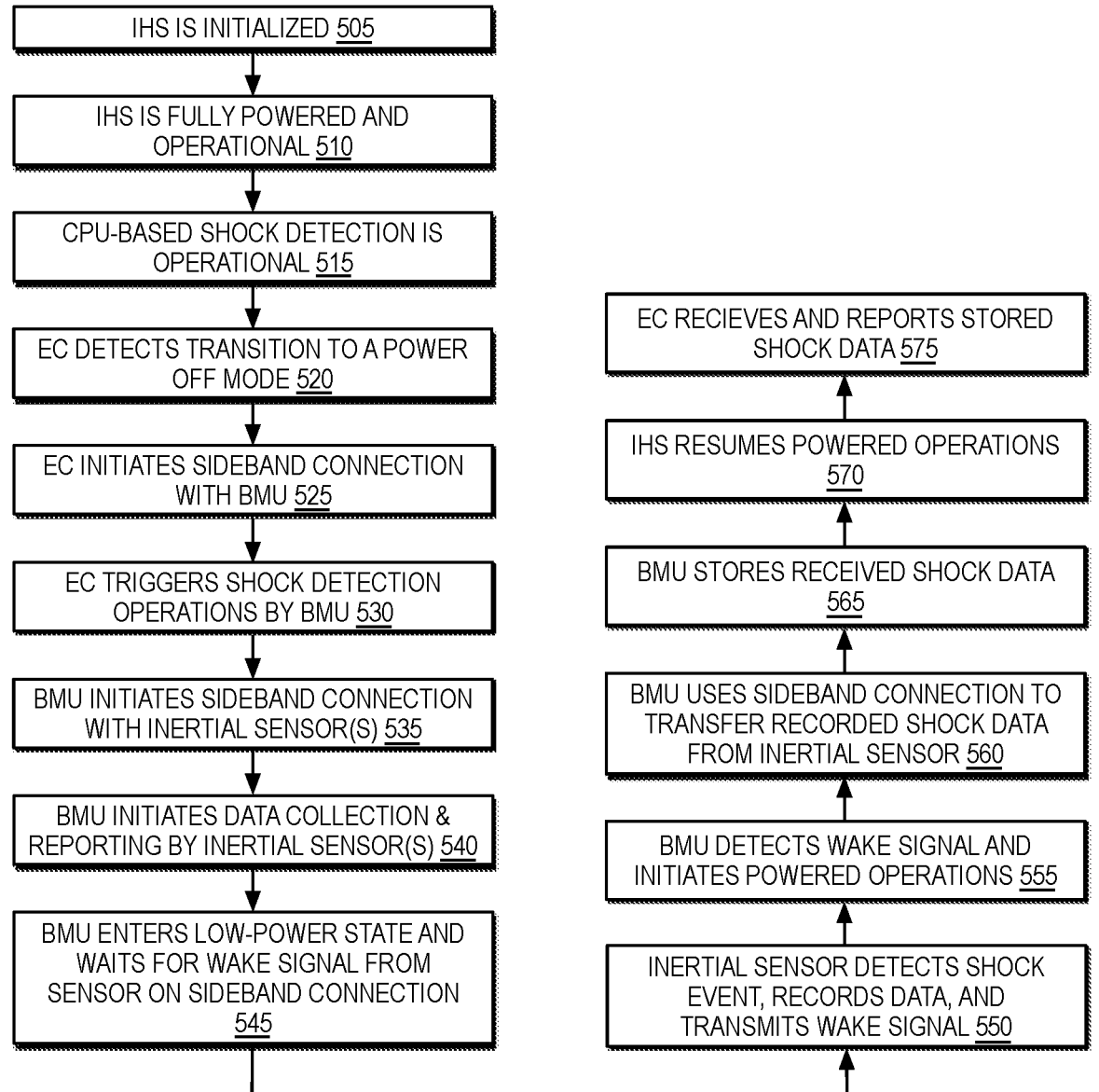

IHS IS INITIALIZED 505

IHS IS FULLY POWERED AND OPERATIONAL 510

CPU-BASED SHOCK DETECTION IS OPERATIONAL 515

EC DETECTS TRANSITION TO A POWER OFF MODE 520

EC INITIATES SIDEBAND CONNECTION WITH BMU 525

EC TRIGGERS SHOCK DETECTION OPERATIONS BY BMU 530

BMU INITIATES SIDEBAND CONNECTION WITH INERTIAL SENSOR(S) 535

BMU INITIATES DATA COLLECTION & REPORTING BY INERTIAL SENSOR(S) 540

BMU ENTERS LOW-POWER STATE AND WAITS FOR WAKE SIGNAL FROM SENSOR ON SIDEBAND CONNECTION 545

EC RECIEVES AND REPORTS STORED SHOCK DATA 575

IHS RESUMES POWERED OPERATIONS 570

BMU STORES RECEIVED SHOCK DATA 565

BMU USES SIDEBAND CONNECTION TO TRANSFER RECORDED SHOCK DATA FROM INERTIAL SENSOR 560

BMU DETECTS WAKE SIGNAL AND INITIATES POWERED OPERATIONS 555

INERTIAL SENSOR DETECTS SHOCK EVENT, RECORDS DATA, AND TRANSMITS WAKE SIGNAL 550

LOW-POWER SHOCK EVENT DETECTION IN A HETEROGENEOUS COMPUTING PLATFORM

FIELD

This disclosure relates generally to Information Handling Systems (IHSs), and more specifically, to systems and methods for detecting falls and other shock events experienced by IHSs.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Portable IHSs (e.g., laptops, tablets, smartphones, etc.) have increased in popularity due to the convenience and versatility they bring to users. As the availability of wireless networks has spread, so has the use of portable IHSs. As the inventors hereof have recognized, increased portability of IHSs also dramatically increases the opportunities for accidents to occur, such as when a user drops their IHS, often resulting in damage. In some instances, the damage may be observable (e.g., a cracked screen), while in other instances, the damage may not be viewable by a user (e.g., a hard disk failure). In some instances, the damage to an IHS that is caused by a fall may manifest itself immediately, such as the cracked screen, while in other instances, the damage may manifest itself over time through various errors and inefficiencies.

SUMMARY

In various embodiments, Information Handling Systems (IHSs) may include: a one or more inertial sensors; one or more processors and a memory coupled to, or integrated into, the processors, wherein the memory comprises program instructions that, upon execution by the processors, run an operating system of the IHS: an Embedded Controller (EC) and a memory coupled to, or integrated into, the EC, wherein the memory comprises program instructions that, upon execution by the EC, cause the EC to: detect a transition to a low-power operating state by the one or more processors; and transmit a signal to a BMU of the IHS to initiate shock detection operations by the BMU; and the BMU (Battery Management Unit) coupled to a battery of the IHS and a memory coupled to, or integrated into, the BMU, wherein the memory comprises program instructions that, upon execution by the BMU, cause the BMU to: initiate a connection to a first of the inertial sensors upon receiving the signal to initiate shock detection; and collect shock event data from the first of the inertial sensors while the one or more processors are in the low-power operating state.

In some embodiments, the one or more inertial sensors comprises at least one of: an accelerometer, a gyroscope, and an Inertial Measurement Unit (IMU). In some embodiments, the low-power operating state by the one or more processors comprises a fully-off state of the IHS. In some embodiments, the fully-off state of the IHS comprise a G3 or S5 power state of the IHS. In some embodiments, the low-power operating state by the one or more processors results from a fault or error. In some embodiments, the low-power operating state by the one or more processors results from a user operation. In some embodiments, the signal transmitted to the BMU to initiate shock detection operations by the BMU is transmitted via a sideband management connection between the EC and the BMU. In some embodiments, the connection by the BMU to the first inertial sensor comprises a sideband management connection between the BMU and the first inertial sensor. In some embodiments, the first inertial sensor wakes the BMU via the sideband management connection between the BMU and the first inertial sensor upon the first initial sensor detecting a shock event. In some embodiments, upon receipt of the wake signal, the BMU retrieves the shock event data collected by the first inertial sensor and transmits the shock event data to the EC. In some embodiments, the shock event data transmitted to the EC is stored by the EC until the EC detects a transition out of the low-power operating state by the one or more processors. In some embodiments, wherein execution of instructions by the BMU further causes the BMU to, upon receiving the signal to initiate shock detection, load instructions for operation of a sensor handling function that is configured to interface with the first inertial sensor.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 5 is a diagram illustrating an example of a method, according to some embodiment, for detecting shock events experienced by an IHS that is in a low-power state.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

The terms "heterogenous computing platform," "heterogenous processor," or "heterogenous platform," as used herein, refer to an Integrated Circuit (IC) or chip (e.g., a System-On-Chip or "SoC," a Field-Programmable Gate Array or "FPGA," an Application-Specific Integrated Circuit or "ASIC," etc.) containing a plurality of discrete processing circuits or semiconductor Intellectual Property (IP) cores (collectively referred to as "SoC devices" or simply "devices") in a single electronic or semiconductor package, where each device has different processing capabilities suitable for handling a specific type of computational task. Examples of heterogenous processors include, but are not limited to: QUALCOMM's SNAPDRAGON, SAMSUNG's EXYNOS, APPLE's "A" SERIES, etc., which typically include ARM core(s).

Figure 1:
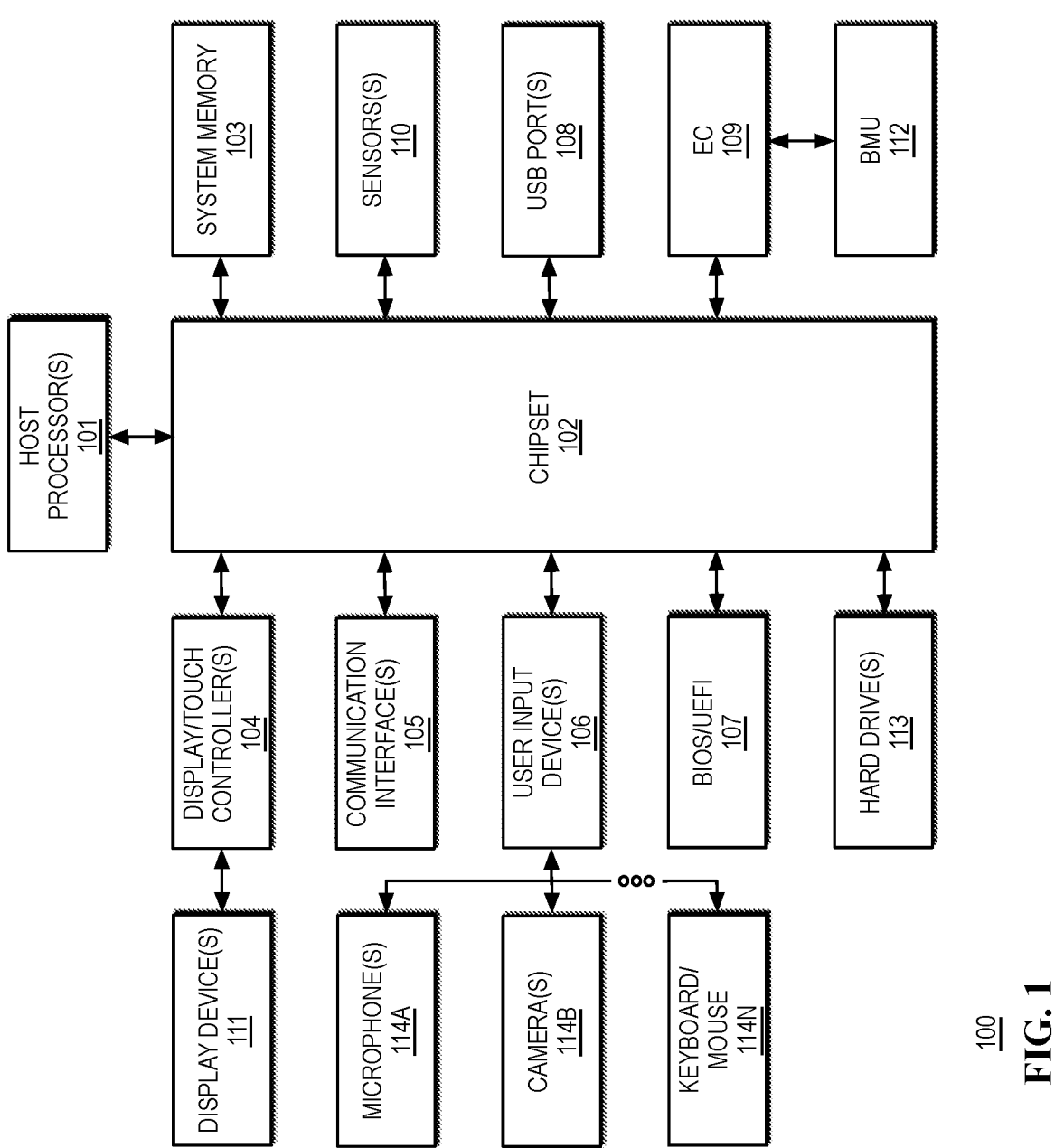
FIG. 1 is a diagram illustrating examples of components of an Information Handling System (IHS) that is configured, according to some embodiments, for detecting shock events experienced by an IHS that is a low-power state.

FIG. 1 is a block diagram of components of an IHS (Information Handling System) 100 that, in some embodiments, may include a heterogenous computing platform, as described in additional detail below, and that is configured to detect shock events experienced by an IHS while the IHS is in a low-power operating state, in particular while configured in a "fully-off" power state where the host processor 101 is not operational. As depicted, IHS 100 includes host processor(s) 101. In various embodiments, IHS 100 may be a single-processor system, or a multi-processor system including two or more processors. Host processor(s) 101 may include any processor capable of executing program instructions, such as an INTEL/AMD x86 processor, or any general-purpose or embedded processor implementing any of a variety of Instruction Set Architectures (ISAs), such as a Complex Instruction Set Computer (CISC) ISA, a Reduced Instruction Set Computer (RISC) ISA (e.g., one or more ARM core(s), or the like).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101. Chipset 102 may also be coupled to communication interface(s) 105 to enable communications between IHS 100 and various wired and/or wireless networks, such as ETHERNET, WIFI, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like.

Communication interface(s) 105 may be used to communicate with peripherals devices (e.g., BT speakers, headsets, etc.). Moreover, communication interface(s) 105 may be coupled to chipset 102 via a Peripheral Component Interconnect Express (PCIe) bus, or the like. Chipset 102 may be coupled to display and/or touchscreen controller(s) 104, which may include one or more or Graphics Processor Units (GPUs) on a graphics bus, such as an Accelerated Graphics Port (AGP) or PCIe bus. As shown, display controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be operate as a single continuous display, rather than two discrete displays.

Chipset 102 may provide host processor(s) 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a Solid-State Drive (SSD), Non-Volatile Memory Express (NVMe), or the like.

In certain embodiments, chipset 102 may also provide host processor(s) 101 with access to one or more USB ports 108, to which one or more peripheral devices may be coupled (e.g., integrated or external webcams, microphones, speakers, etc.). Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.).

In certain embodiments, chipset 102 may further provide an interface for communications with one or more hardware sensors 110. Sensor(s) 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), accelerometer, etc.

Basic Input/Output System (BIOS) 107 is coupled to chipset 102. Unified Extensible Firmware Interface (UEFI) was designed as a successor to BIOS, and many modern IHSs utilize UEFI in addition to or instead of a BIOS. Accordingly, the term "BIOS" is also intended to also encompass a UEFI component. In operation, BIOS 107 provides an abstraction layer that allows the OS to interface with certain hardware components that are utilized by IHS 100.

Upon booting of IHS 100, host processor(s) 101 may utilize program instructions of BIOS 107 to initialize and test hardware components coupled to IHS 100, and to load host OS 300 for use by IHS 100. Via the hardware abstraction layer provided by BIOS 107, software stored in system memory 103 and executed by host processor(s) 101 can interface with certain I/O devices that are coupled to IHS 100.

Embedded Controller (EC) 109 (sometimes referred to as a Baseboard Management Controller or "BMC") includes a microcontroller unit or processing core dedicated to handling selected IHS operations not ordinarily handled by host processor(s) 101. Examples of such operations may include, but are not limited to: power sequencing, power management, receiving and processing signals from a keyboard or touchpad, as well as operating chassis buttons and/or switches (e.g., power button, laptop lid switch, etc.), receiving and processing thermal measurements (e.g., performing cooling fan control, CPU and GPU throttling, and emergency shutdown), controlling indicator Light-Emitting Diodes or "LEDs" (e.g., caps lock, scroll lock, num lock, battery, ac, power, wireless LAN, sleep, etc.), managing a battery charger and a battery, enabling remote management, diagnostics, and remediation over an OOB or sideband network, etc. Moreover, in various implementations, EC 109 may be configured to perform operations for shock and fall detection during low-power conditions of an IHS 100, as described in more detail below.

Unlike other devices in IHS 100, EC 109 may be operational from IHS being powered, in particular before other devices are fully running or even powered. As such, EC 109 firmware may be responsible for interfacing with a power adapter to manage the various power states that may be supported by IHS 100. Power operations of the EC 109 may also provide other components of the IHS 100 with power status information for the IHS, such as whether IHS 100 is operating from battery power or is plugged into an AC power source. Firmware instructions utilized by EC 109 may be used to manage other core operations of IHS 100 (e.g., turbo modes, maximum operating clock frequencies of certain components, etc.).

From the perspective of users, IHS 100 may appear to be either "on" or "off," without any other detectable power states. In some embodiments, however, an IHS 100 may support multiple power states that may correspond to the states defined in the Advanced Configuration and Power Interface (ACPI) specification, such as: S0, S1, S2, S3, S4, S5, and G3. For example, when an IHS 100 is operating in S0 working mode, the IHS is operational, but some hardware components that are not in use may still be individually configured in low power states. In an S0 low-power, idle mode ("Sleep" or "Modern Standby"), an IHS 100 remains partially running with various capabilities of the IHS (e.g., displays, network controllers) may be powered down and other capabilities (e.g., EC, processors) may be in low-power standby modes, thus supporting the ability of the IHS to quickly transition from to a full-power, working S0 mode in response to various events. In the past, S3 was commonly used as a default "Sleep state." However, many IHSs 100 utilize the described Modern Standby, which may be designated as a hybrid "S0ix" mode, where some or all of the internal hardware of IHS 100 may be placed into their lowest power state, while still supporting code execution that allows fast response and transition of the IHS to a working S0 mode.

An IHS 100 may additionally or alternatively support other low-power modes, such as S1-S3 (that may also be referred to as "Sleep" modes), where the IHS may appear to users to be in an off state. Some IHSs may support only one or two of these states, where the number of distinct states may be a reflection of power saving features of the IHS that have been selected for use. For instance, the amount of power consumed in states S1-S3 is less than S0 and more than S4. An S3 mode consumes less power than S2, and S2 consumes less power than S1. In states S1-S3, volatile memory may be periodically refreshed in order to maintain the operating state of the IHS, with some components remaining powered so that the IHS may wake based on inputs from a keyboard, Local Area Network (LAN), or a Universal Serial Bus (USB) device.

In the S4 state ("Hibernate"), power consumption is reduced to its lowest level. The IHS saves the contents of volatile memory to a hibernation file and some components remain powered, allowing the IHS to wake based on detected input from the keyboard, LAN, or a USB device. "Hybrid sleep" may implemented by some IHSs may use a hibernation file that is used to save the IHS's operating state, and also used to resume the IHSs operations upon reverting to a working S0 mode. "Fast startup" may refer to a power state where the user is logged off before the hibernation file is created, which allows for a smaller hibernation file in IHSs with reduced storage capabilities.

When in the S5 state ("Soft off" or "Full Shutdown"), an IHS 100 is fully shut down without a hibernation file. It occurs when a restart is requested or when an application invokes a shutdown command of the OS, EC 109, etc. During a full shutdown and re-boot, the user session is methodically de-constructed and restarted on the next boot. In some instances, a boot/startup from an S5 state takes significantly longer than resuming from S1-S4 states. At the hardware level, the main difference between S4 and S5 may be that S4 sets a flag on the storage device used to store the hibernation file and configures the bootloader to boot from the flagged hibernation file instead of booting the OS from scratch.

In a G3 ("Mechanical off") power mode, the IHS 100 may be completely turned off and consumes absolutely no power from its Power Supply Unit (PSU) or main battery (e.g., a lithium-ion battery), with the exception of any Real-Time Clock (RTC) batteries (e.g., Complementary Metal Oxide Semiconductor or "CMOS" batteries, Basic Input/Output System or "BIOS" batteries, coin cell batteries, etc.), which are used to provide power for the IHS's internal clock/calendar and for maintaining certain configuration settings. In some instances, G3 represents the lowest possible power configuration of an IHS from which the IHS can be initialized. From a G3 mode, an IHS may transition to an S5 mode in response to AC power source coupling (i.e., transitioning between battery mode to AC mode). Additionally, or alternatively, an IHS may transition from G3 to S0 based upon the detection of a power button event.

As described herein, embodiments support shock detection operations by IHS 100 while the IHS is in low power modes in which the host processor(s) 101 is not drawing power from the main battery of the IHS. As described in additional below, an IHS 100 may include a BMU (Battery Management Unit) 112 that is configured to report characteristics of the rechargeable battery (e.g., charge levels, battery conditions) of the IHS, and to control some battery operations, such as initiating various protection modes that prevent the battery from operating outside of safe conditions and/or that prevent damage to the battery. While in low-power modes such as a fully off G3 power state, no power is drawing from the battery by the host processors 101 and thus by any SoCs that implemented by a host processor. Accordingly, any shock detection capabilities that are implemented by a host processor 101 and/or SoC, such as shock detection capabilities of a sensor hub 207, are not operational while in these low power modes.

As described in additional detail below, in embodiments, a BMU 112 may implement procedures for shock detection during such low-power modes of an IHS. In embodiments, a BMU may remain operational for detecting shock detection by drawing power from the batter while in all low power modes, including fully off power modes. In some embodiments, the embedded controller 109 may be configured with an always-on power rail or the like, such that the EC continues to retain at least some capabilities while an IHS 100 is in a low power state, in some embodiments including a G3 state. As described in more detail below, in various embodiments, EC 109 may be configured to trigger BMU 112 shock detection procedures upon detecting a power state transition that will result in disabling of shock detection procedures provided by a sensor hub 207 of the IHS.

EC 109 firmware may also implement operations for detecting certain changes to the physical configuration or posture of IHS 100 (such as a laptop computer), and may also manage operations of other IHS devices based on the current physical configuration of IHS 100. For instance, when IHS 100 as a 2-in-1 laptop/tablet form factor, EC 109 may receive inputs from a lid position or hinge angle sensor 110, and may use those inputs to determine: whether the two sides of IHS 100 have been latched together to a closed position or a tablet position, the magnitude of a hinge or lid angle, etc. In response to these changes, the EC 109 may enable or disable certain features of IHS 100 (e.g., front or rear facing camera, etc.).

In this manner, EC 109 may identify any number of IHS physical postures, including, but not limited to: laptop, stand, tablet, or book. For example, when an integrated display 111 of IHS 100 is open with respect to a horizontal, face-up position of an integrated keyboard, EC 109 may determine IHS 100 to be in a laptop posture. When an integrated display 111 of IHS 100 is open with respect to a horizontal keyboard portion, but the keyboard is facing down (e.g., its keys are against the top surface of a table), EC 109 may determine IHS 100 to be in a kickstand posture. When the back of an integrated display 111 is closed against the back of the keyboard portion of an IHS, EC 109 may determine IHS 100 to be folded in a tablet posture. When IHS 100 has two integrated displays 111 that are open side-by-side (e.g., in a hybrid laptop with displays in both panels), EC 109 may determine an IHS 100 to be in a book posture. When an IHS 100 is determined to be in a book posture, EC 109 may also determine if the display(s) 111 of IHS 100 are arranged in a landscape or portrait orientation, relative to the user.

In some implementations, EC 109 may be installed as a Trusted Execution Environment (TEE) component to the motherboard of IHS 100. Accordingly, as a component with the root of trusted hardware of IHS 100, EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC 109 may later recalculate a hash value based on instructions and settings loaded for use by a hardware component of IHS 100 and may compare the calculated value against the reference hash value to determine if any modifications have been made to the component, thus indicating that the component has been compromised. As such, EC 109 may validate the integrity of hardware and software components installed in IHS 100.

In some embodiments, EC 109 may provide an OOB (Out-Of-Band) or sideband channel that allows an ITDM or Original Equipment Manufacturer (OEM) to manage various settings and configurations of an IHS 100. OOB is used in contradistinction with "in-band" communication channels that operate only after networking 105 other interfaces of the IHS have been initialized, and the OS of the IHS has been successfully booted. In some embodiments, these OOB channels supported by the EC 109 include a sideband management connection, such as an I2C management bus, with the BMU 112 of the IHS. As described in additional detail below, this sideband connection may be utilized by the EC 109 in initiating shock event detection by the BMU 112, such as during a low-power operating state of the IHS during which sensor hub 207 shock detection capabilities are not operational.

Figure 2:
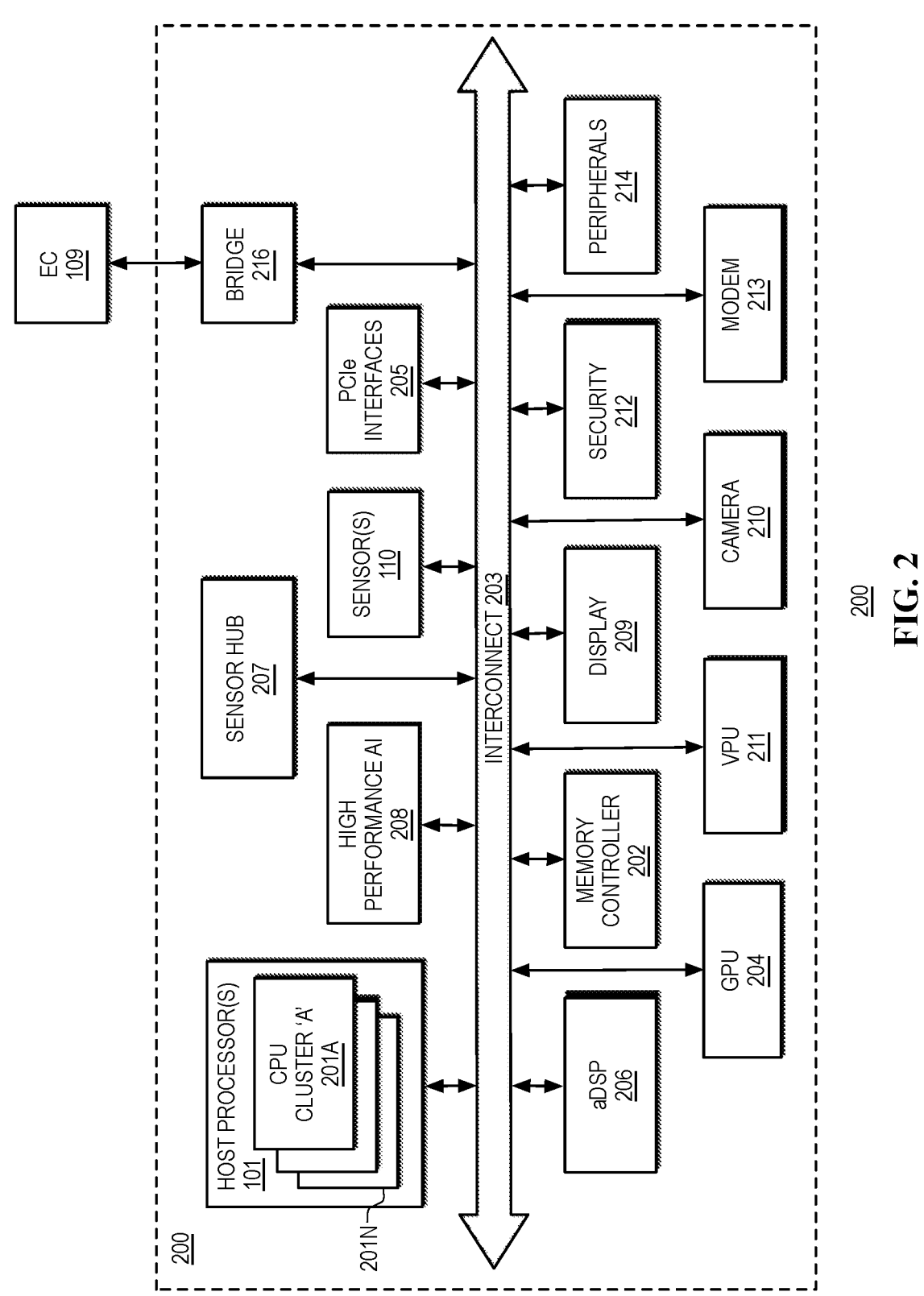
FIG. 2 is a diagram illustrating an example of a heterogenous computing platform configured, according to some embodiments, for detecting shock events when in a low-power state.

In various embodiments, IHS 100 may be coupled to an external power source through an AC adapter, power brick, or the like. The AC adapter may be removably coupled to a battery charge controller to provide IHS 100 with a source of DC power provided by battery cells of a battery system in the form of a battery pack (e.g., a lithium ion or "Li-ion" battery pack, or a nickel metal hydride or "NiMH" battery pack including one or more rechargeable batteries). Battery Management Unit (BMU) 112 may be coupled to EC 109 and it may include, for example, an Analog Front End (AFE), storage (e.g., non-volatile memory), and a micro-controller. In some cases, BMU 112 may be configured to collect and store information, and to provide that information to other IHS components, such as, for EC 109 and/or other devices within heterogeneous computing platform 200 (FIG. 2).

Examples of information collectible by BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), etc.

In some embodiments, BMU 112 may include a micro-controller or other logic unit that executes firmware instructions in order collect and report battery information and in managing certain battery operations, such as initiating battery protecting modes. In some embodiments, these firmware instructions of BMU 112 also implement shock detection operations by the BMU. As described in additional detail with regard to FIG. 3, in some embodiments, a BMU 112 may include a sideband signaling pathway, such as an I2C management connection, that connects to an accelerometer and/or other inertial sensors of IHS 100. Through this sideband connection, the firmware of BMU 112 may configure and operate an accelerometer, and/or other inertial sensors, in performing shock detection operations while IHS 100 is in a low power state. Even in a G3 or other fully-off state, the BMU 112 remains connected to the battery and remains able to draw power for use in operating the micro-controller or other logic unit of the BMU.

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For instance, in various embodiments, host processor(s) 101 and/or other components shown in FIG. 1 (e.g., chipset 102, display controller(s) 104, communication interface(s) 105, EC 109, etc.) may be replaced by devices within heterogenous computing platform 200 (FIG. 2). As such, IHS 100 may assume different form factors including, but not limited to: servers, workstations, desktops, laptops, appliances, video game consoles, tablets, smartphones, etc.

Historically, IHSs with desktop and laptop form factors have had conventional host OSs executed on INTEL or AMD's "x86"-type processors. Other types of processors, such as ARM processors, have been used in smartphones and tablet devices, which typically run thinner, simpler, and/or mobile OSs (e.g., ANDROID, IOS, WINDOWS MOBILE, etc.). More recently, however, IHS manufacturers have started producing fully-fledged desktop and laptop IHSs equipped with ARM-based, heterogeneous computing platforms. Accordingly, host OSs (e.g., WINDOWS on ARM) have been developed to provide users with a familiar OS experience on those platforms.

FIG. 2 is a diagram illustrating an example of heterog-enous computing platform 200. In various embodiments, heterogenous computing platform 200 may be implemented in one or more SoCs, FPGAs, ASICs, or the like. Heterog-enous computing platform 200 may include one or more discrete and/or segregated devices or components, each having a different set of processing capabilities suitable for handling a particular type of computational task. When each device in platform 200 is tasked with executing only the types of computational tasks that it is specifically designed to execute, the overall power consumption of heterogenous computing platform 200 is minimized.

In various implementations, some of the devices in het-erogenous computing platform 200 may include their own microcontroller(s) or core(s) (e.g., ARM core(s)) and cor-responding firmware. In some cases, a device in platform 200 may also include its own hardware-embedded accelera-tor (e.g., a secondary or co-processing core coupled to a main core). Each device in heterogenous computing plat-form 200 may be accessible through a respective Applica-tion Programming Interface (API). Additionally, or alterna-tively, some devices in heterogenous computing platform 200 may execute their own OS. Additionally, or alterna-tively, one or more of the devices of heterogenous comput-ing platform 200 may be virtual devices.

In the embodiment illustrated in FIG. 2, heterogenous computing platform 200 includes CPU clusters 201A-N that may correspond to system processor(s) 101, and that are intended to perform general-purpose computing operations. Each of CPU clusters 201A-N may include one or more processing cores and cache memories. In operation, CPU clusters 201A-N are available and accessible to the IHS's host OS 300 (e.g., WINDOWS on ARM) and other appli-cations executed by IHS 100.

CPU clusters 201A-N may be coupled to memory con-troller 202 via internal interconnect fabric 203. Memory controller 202 may be responsible for managing system memory access for all of devices connected to internal interconnect fabric 203, which may include any communi-cation bus suitable for inter-device communications within an SoC (e.g., Advanced Microcontroller Bus Architecture or "AMBA," QuickPath Interconnect or "QPI," HyperTrans-port or "HT," etc.). All devices coupled to internal intercon-nect fabric 203 may communicate with each other and with a host OS executed by CPU clusters 201A-N. In some cases, devices 209-211 may be coupled to internal interconnect fabric 203 via a secondary interconnect fabric (not shown). A secondary interconnect fabric may include any bus suit-able for inter-device and/or inter-bus communications within an SoC.

A GPU 204 of the heterogenous computing platform 200 produces graphical or visual content and communicates that content to a monitor or display of the IHS 100 for rendering. In some embodiments, display engine 209 may be designed to perform additional video enhancement operations. In operation, display engine 209 may implement procedures for provide the output of GPU 204 as a video signal to one or more external displays coupled to IHS 100 (e.g., display device(s) 111). PCIe interfaces 205 provide an entry point into any additional devices external to heterogenous com-puting platform 200 that have a respective PCIe interface (e.g., graphics cards, USB controllers, etc.).

Audio Digital Signal Processor (aDSP) 206 is a device designed to perform audio and speech operations and to perform in-line enhancements for audio input(s) and output(s). Examples of audio and speech operations include, but are not limited to: noise reduction, echo cancellation, directional audio detection, wake word detection, muting and volume controls, filters and effects, etc. In operation, input and/or output audio streams may pass through and be processed by aDSP 206, which can send the processed audio to other devices on internal interconnect fabric 203 (e.g., CPU clusters 201A-N). In some embodiments, aDSP 206 may be configured to process one or more of heterogenous computing platform 200's sensor signals (e.g., gyroscope, accelerometer, pressure, temperature, etc.), low-power vision or camera streams (e.g., for user presence detection, onlooker detection, etc.), or battery data (e.g., to calculate a charge or discharge rate, current charge level, etc.).

Camera device 210 includes an Image Signal Processor (ISP) configured to receive and process video frames cap-tured by a camera coupled to heterogenous computing platform 200 (e.g., in the visible and/or infrared spectrum). Video Processing Unit (VPU) 211 is a device designed to perform hardware video encoding and decoding operations, thus accelerating the operation of camera 210 and display/graphics device 209. VPU 211 may be configured to provide optimized communications with camera device 210 for performance improvements.

Sensor hub 207 may include AI capabilities designed to consolidate information received from other devices in heterogenous computing platform 200, process context and/or telemetry data streams, and provide that information to: (i) a host OS, (ii) other applications, and/or (iii) other devices in platform 200. In collecting data, sensor hub 207 may include General-Purpose Input/Output (GPIOs) that provide Inter-Integrated Circuit ($I^2C$), Improved $I^2C$ ($I^3C$), Serial Peripheral Interface (SPI), Enhanced SPI (eSPI), and/or serial interfaces to receive data from sensors (e.g., sensors 110, camera 210, peripherals 214, etc.). Sensor hub 207 may include a low-power core configured to execute small neural networks and specific applications, such as contextual awareness and other enhancements.

High-performance AI device 208 is a significantly more powerful processing device than sensor hub 207, and it may be designed to execute multiple complex AI algorithms and models concurrently (e.g., Natural Language Processing, speech recognition, speech-to-text transcription, video processing, gesture recognition, user engagement determinations, etc.). For example, high-performance AI device 208 may include a Neural Processing Unit (NPU), Tensor Processing Unit (TPU), Neural Network Processor (NNP), or Intelligence Processing Unit (IPU), and it may be designed specifically for AI and Machine Learning (ML), which speeds up the processing of AI/ML tasks while also freeing processor(s) 101 to perform other tasks. Using such capabilities, one or more devices of heterogeneous computing platform 200 (e.g., GPU 204, aDSP 206, sensor hub 207, high-performance AI device 208, VPU 211, etc.) may be configured to execute one or more AI model(s), simulation(s), and/or inference(s).

Security device 212 may include one or more specialized security components, such as a dedicated security processor, a Trusted Platform Module (TPM), a TRUSTZONE device, a PLUTON processor, or the like. In various implementations, security device 212 may be used to perform cryptography operations (e.g., generation of key pairs, validation of digital certificates, etc.) and/or it may serve as a hardware root-of-trust (RoT) for heterogenous computing platform 200 and/or IHS 100.

Modem/wireless controller 213 may be designed to enable wired and wireless communications in any suitable frequency band (e.g., BLUETOOTH or "BT," WiFi, CDMA, 5G, satellite, etc.), subject to AI-powered optimizations/customizations for improved speeds, reliability, and/or coverage. Peripherals 214 may include any device coupled to heterogenous computing platform 200 (e.g., sensors 110) through mechanisms other than PCIe interfaces 205. In some cases, peripherals 214 may include interfaces to integrated devices (e.g., built-in microphones, speakers, and/or cameras), wired devices (e.g., external microphones, speakers, and/or cameras, Head-Mounted Devices/Displays or "HMDs," printers, displays, etc.), and/or wireless devices (e.g., wireless audio headsets, etc.) coupled to IHS 100.

In some implementations, EC 109 may be integrated into heterogenous computing platform 200 of IHS 100. In other implementations EC 109 may be external to the heterogenous computing platform 200 (i.e., the EC 109 residing in its own semiconductor package) but coupled to integrated bridge 216 via an interface (e.g., enhanced SPI or "eSPI"), thus supporting the EC's ability to access the SoC's internal interconnect fabric 203, including sensor hub 207 and sensor(s) 110. Through this connectivity supported by the interconnect fabric 203, EC 109 may directly access and/or operate most or all of devices 201-216, 110 of the heterogenous computing platform 200.

Figure 3:
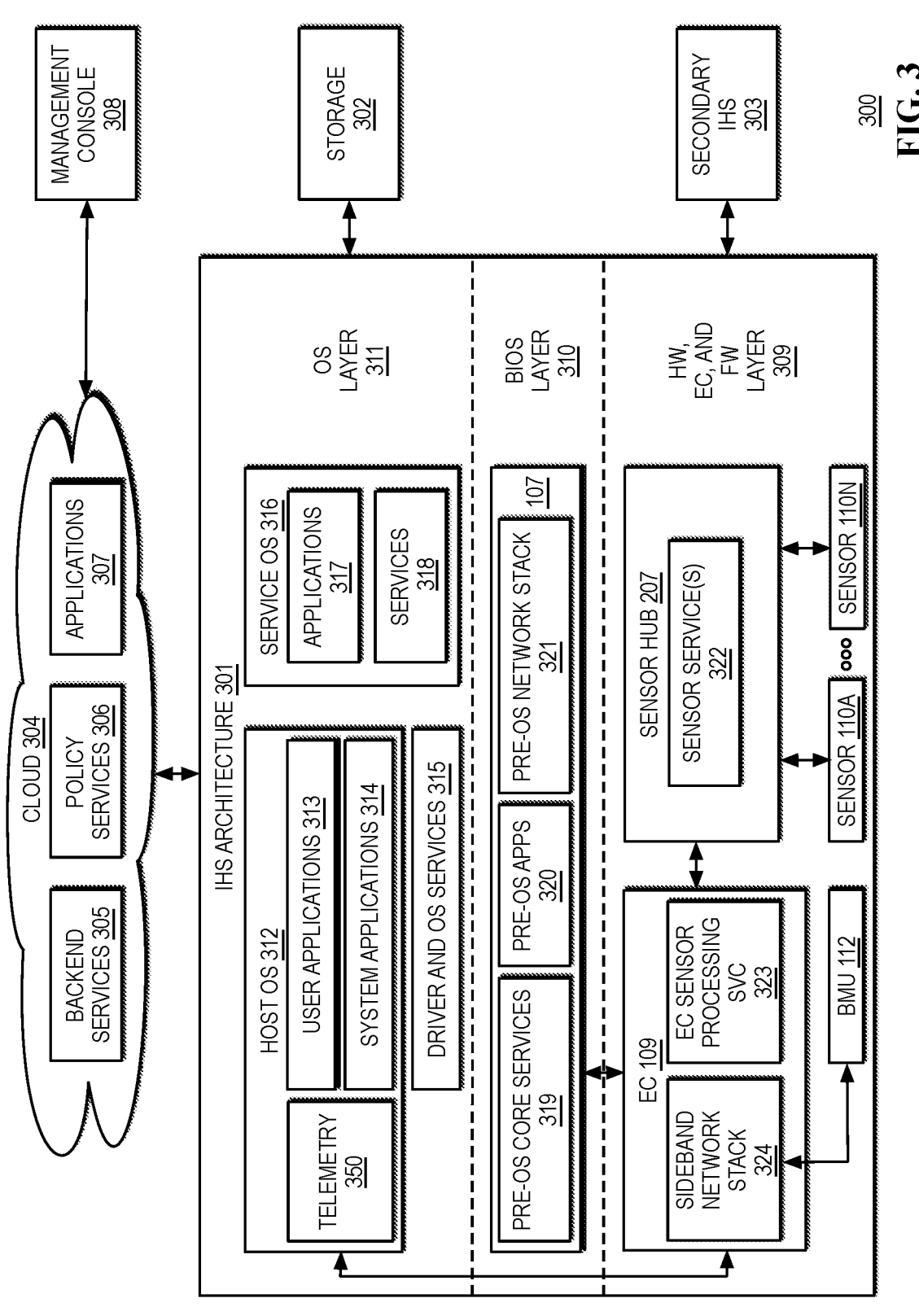
FIG. 3 is a diagram illustrating an example of a system, according to some embodiments, for detecting shock events experienced by an IHS that is in a low-power state.

FIG. 3 is a diagram illustrating an example of architecture 300 for detecting shock events experienced by an IHS that is in a low-power state. Particularly, architecture 300 includes IHS 301 (e.g., implementing aspects of IHS 100 and/or platform 200) coupled to storage device 302 (e.g., NVMe, SSD, etc.), secondary or companion IHS 303 (e.g., a smart phone, a laptop, etc.), and cloud or remote services 304. Cloud 304 may include backend or remote services 305, policy services 306, and web applications 307. In some cases, components of cloud 304 may be accessible to IHS 301 and/or secondary IHS 303, and configurable via ITDM management console 308.

IHS architecture 301 may include hardware/EC/firmware layer 309, BIOS layer 310, and OS layer 311. Specifically, OS layer 311 includes a host OS (Operating System) 312 that is executed by host processor(s) 101. A variety of software applications may operate within the OS 312, where these applications may include user applications 313 and system applications 314. As illustrated in FIG. 3, the applications that operate within the OS 312 may also include one or more telemetry applications 350.

OS layer 311 may also include various drivers and other core OS operations, such as the operation of a kernel. As described, various components of a heterogenous computing platform 200 may independently run their own operating systems, such as a OS run by an SoC. Within IHS architecture 301, some of these discrete operating systems operating on individual components of the heterogenous computing platform 200 may be considered service OSs 316, where each service OS may each include its own applications 317 and services 318.

BIOS layer 310 may include pre-OS core services 319, pre-OS applications 320, and pre-OS network stack 321 that are each executed by BIOS 107. BIOS core services 319 may include operations for identifying and validating the detected hardware components of an IHS. BIOS applications 320 may include operations for interfacing with certain hardware devices of an IHS, in particular user input devices. The network stack 321 of BIOS 310 may be utilized during initialization of the IHS in support of validation procedures, such as in retrieving reference signatures corresponding to authentic firmware instructions for hardware components of an IHS 100.

As illustrated, IHS architecture 301 also includes a hardware/EC/firmware layer 309 that includes EC 109 and sensor hub 207. As described above, EC 109 may implement a variety of procedures for management of individual hardware of an IHS 100 and of the IHS itself, including management of the various power states that are supported by the IHS. EC 109 is configured to execute one or more sensor services 323 that interface with sensor hub 207 in implementing various features of an IHS 100, such responses to user-presence determinations by the sensor hub 207 that is acted upon by the EC 109 in initiation heightened security protocols, such as initiating screen blurring in response to detecting possible onlookers. As described, EC 109 may interface with some or all of the individual hardware components/systems of an IHS via sideband management channels that are separate from inline communication channels used by the host processor 101 and SoCs.

As described above, sensor hub 207 may receive inputs from some or all of the sensors 110A-N of an IHS 100. Sensor hub 207 may implement a variety of sensor service(s) 322 for communicating with and collecting data from sensors 110A-N. In some embodiments, sensor hub 207 may implement shock detection procedures that ma incorporate inputs from inertial and other sensors 110A-N of an IHS. Such shock detection procedures may be robust in detecting shocks experienced by an IHS 110 and in characterizing and assessing detected shocks in evaluating possible damage to the IHS. However, in scenarios where sensor hub 207 is not powered, these shock detection capabilities are not operational.

Accordingly, as described in additional detail below, embodiments may activate shock detection capabilities of a BMU 112 during these intervals, where these capabilities of the BMU 112 may be activated via sideband network stack 324 communications. Once the shock detection capabilities of the BMU 112 have been activated, it may load instruction for operation of a sensor handler function. Once activated, the sensor handler function may utilize a sideband communication pathway for configuring and retrieving data collected by one or more inertial sensors of the IHS sensors 110A-N. Shock event data that is collected by the BMU 112 may then be transmitted to the EC 109 via the sideband network stack 324. From this sideband network stack 324, the EC 109 may route the collected shock event data to various storage locations based on the volume of data that has been collected.

Figure 4:
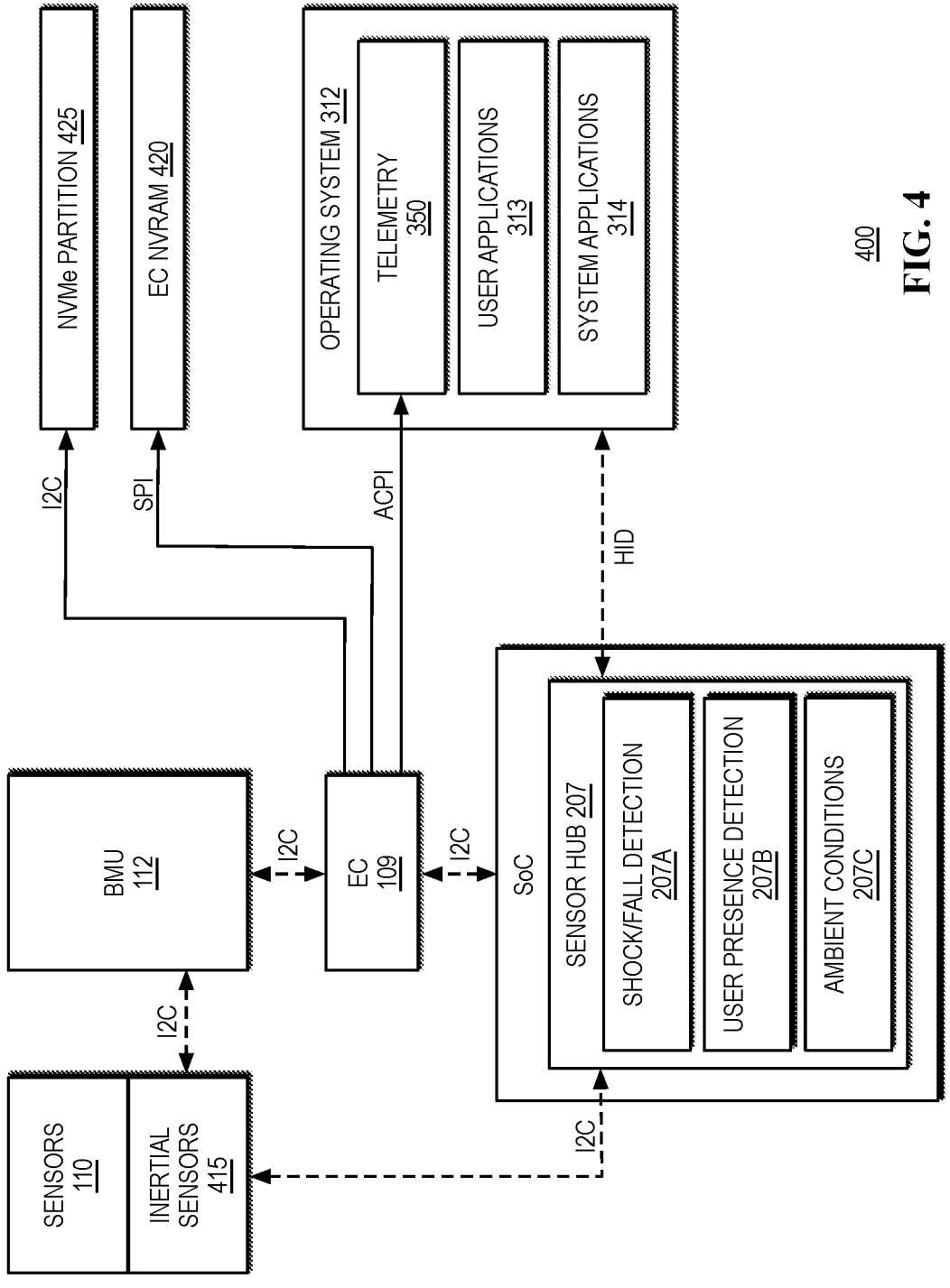
FIG. 4 is a diagram illustrating certain components of an IHS configured, according to some embodiments, for detecting shock events experienced by the IHS while it is in a low-power state.

FIG. 4 is a diagram illustrating certain components of an IHS configured, according to some embodiments, for detecting shock events experienced by the IHS while it is in a low-power state. As described above, existing IHSs may include robust shock detection capabilities 207a that may be implemented by a sensor hub 207 of the IHS 100. Sensor hub 207 may implement various operations that incorporate information from one or more sensors 110 of an IHS. For instances, user presence detection 207b operations by sensor hub 207 may locate, and in some instances identify, individuals in close proximity to an IHS, such as based on camera inputs and time-of-flight type sensor 110 inputs. Sensor hub 207 may additionally or alternatively implement ambient condition operations 207c that monitor and report environmental conditions detected by sensors 110, such as ambient lighting and ambient temperature information.

As described above, these operations of the sensor hub 207 are not operational when an IHS is in a fully off operating state. During a fully off operating state, processors 101 and SoCs that may be used in implementing a sensor hub 207 are not powered, or at least not operational, such that existing shock detection procedures 207a are not operational. In embodiments, limited shock detection operations may be implemented by firmware operations of BMU 112, which may draw power directed from the batteries of an IHS in all power states, including fully off power states.

As described in additional detail below, in embodiments, EC 109 detects power state transitions in which the sensor hub 207 and/or other existing shock detection procedures will not be operational. For instance, EC 109 may detect a user input, whether a graphical interface input to operating system 312, or from a user input detected in the form of a button press or key sequence. In some embodiments, EC 109 may detect power state transitions resulting from errors or faults, such as a hardware failure that renders processors 101 and/or SoCs inoperative. Upon detecting such conditions, EC 109 may activate shock detection procedures that are implemented by BMU 112 firmware, where such activation may be initiated through a sideband management connection between these two components.

Once the BMU 112 has received a notification from the EC 109, the BMU 112 may load instructions for operation of a sensor handler function by the BMU. The sensor handler function may be configured to interface with one or more sensors of the IHS that may be used in the detection of shock events during low power events. The operations implemented by the sensor handler function may utilize a sideband signaling pathway that connects the BMU to one or more inertial sensors 415, such as an accelerometer. Though this sideband connection, the sensor handler function of the BMU 112 may configure shock detection operations by the inertial sensor(s) 415, such as configuring detection and reporting thresholds for use by the inertial sensors while providing shock detection procedures that are implemented by the BMU 112 while the IHS is a low-power mode. Upon detecting a shock event experienced by an IHS, measurements by inertial sensor(s) 415 may be recorded and transmitted to the sensor handler function of the BMU 112 via the sideband management connection. The BMU 112 may include a data storage device, but it may be limited in size and thus may not be sufficient to store received shock data.

In some embodiments, the sensor handler function of the BMU 112 may include operations for using the onboard BMU storage that is available to buffer the collected shock event data that is received from the inertial sensor(s) 415. From this internal buffer, the sensor handler function of the BMU 112 may transmit the shock event data to the EC 109 via the sideband signaling pathway that connects these two components. As described, the BMU 112 may draw power as long as sufficient power is available in the IHS batteries and EC 109 may operate from a power rail separate from the host processors 101 and SoCs, thus supporting the transfer of this shock event data to the EC 109 even in fully off operating states of the IHS 100.

Once shock event data is received, the EC 109 may store the data directly to an onboard NVRAM 420 of the EC. Based on the volume of shock event data that is received, the EC 109 may determine that onboard NVRAM 420 is insufficient. In such instances, EC 109 may direct received shock event data to an NVMe partition 425 that is accessible to the EC, such as an NVMe boot partition that is designated for use by the EC. As described, these procedures by embodiments for shock detection by BMU 112 may be initiated due to transition of IHS 100 to a fully off power state, such as based on user input, or due to an error or fault. Throughout the fully off interval, embodiments may detect and record any number of shock events that may each be reported to the EC 109 and stored, such as to an onboard NVRAM 420 and/or to an NVMe partition 425.

In scenarios where the IHS 100 is repowered, boots normally and sensor hub 207 shock detection operations resume, the EC 109 may be configured to disable shock event detection by BMU 112 and to report the collected shock event data. In some embodiments, the EC 109 retrieves the stored shock event data and forwards it for analysis to cloud 304 analytics for ongoing evaluation shock events that are detected and reported by the IHS 100, including by embodiments and by existing sensor hub 207 shock detection systems. In some embodiments, in scenarios where the IHS has resumed normal operations, the shock event data collected by EC 109 may be reported to sensor hub 207 for further training of shock detection models that are implemented by the sensor hub.

In scenarios where the IHS does not boot normally, such as due to a hardware fault or due to damage resulting from the detected shocks, EC 109 may be configured to report the collected shock event data to a management console 308 or other diagnostic service. In such instances, the EC 109 may report the collected shock event data to a stored address of a diagnostic service that may utilize the data in initiating remediation procedures.

FIG. 5 is a diagram illustrating an example of a method, according to some embodiment, for detecting shock events involving an IHS that is in a low-power state. Embodiments may thus begin, at 505, with the initialization of an IHS 100 that includes a heterogenous computing platform 200. Upon initialization, the IHS 100 may powered and validated as operating using trusted hardware and using authentic instructions. Initialization may include booting of one or more operating systems 312. In some embodiments, the host processor 101 may operate a host OS 312, where this host OS 312 may be operated by a user of the IHS 100 through various user inputs. In some embodiments, multiple other operating systems, such as one or more service OSs 316, may be operated by other processors or by SoCs of the heterogenous computing platform 200.

Once the host OS 312 has been booted, at 510, the IHS is operating in a S0 power state where the IHS if fully powered, but individual hardware components of the IHS that are idle may be individually placed in low power states. In some existing systems, at 515, the IHS may initiate shock detection operations. In some instances, existing shock detection procedures may be implemented directly by processors 101 of an IHS. In some instances, existing shock detection procedures may be implemented by a sensor hub 207 of a heterogenous computing platform 200. These shock detection procedures that are implemented by a sensor hub 207 may incorporate data from multiple sensors 110 of an IHS, including from multiple available inertial sensors such as an accelerometer, gyroscope, or Inertial Measurement Unit (IMU) of the IHS. The sensor hub 207 may also incorporate data from various other sensors 110 or sources in detecting and characterizing shock events that are experienced by the IHS, including making determinations regarding possible details pertaining to the shock event, such as a height of a fall, the hardness of a surface that the IHS has contacted as part of the shock event, possible damage caused by the fall, identifying an individual in proximity to the IHS at the time of the shock, etc.

These robust shock detections operation by the sensor hub 207 require more than nominal power. Nonetheless, in some existing systems, some sensor hub 207 operations, such as shock detection operations, may include operations during power states of an IHS that may be considered "low-power" states. For instance, shock detection operations by a sensor hub 207 may be operational during S0ix modern-standby and during various sleep states of an IHS. However, as described above, during fully off power states, such as S5 and G3, the processors 101 and any SoCs of an IHS are powered down. Accordingly, in such fully off operating states, a heterogenous computing platform 200 that is implemented by an SoC is not operational. As a result, shock detection operations by a sensor hub 207 are not operational during these fully-off power states.

An IHS 100 may operate for any amount of time in fully powered modes while using existing shock detection procedures, such as those supported by a sensor hub 207 and/or processor 101 of the IHS. At 520, the EC 109 of the IHS detects a transition of the IHS to a fully off power mode. As described above, in some embodiments, an EC 109 may implement operations for transitioning an IHS 100 to the various supported power states. Accordingly, EC 109 may be configured to detect any transitions to fully off power states, such as S5 and G3 power states where existing shock detection procedures are not operational. The EC 109 may detect requested transitions to these fully off power states, such as requests issued via the host OS 312 or via a power button of an IHC. The EC 109 may additionally detect unplanned transitions to these fully off power states, such as a result of errors or other faults in the hardware or software of an IHS 100. In some embodiments, EC 109 may additionally detect errors, faults and/or restarts of processors 101, sensor hub 207 and/or SoCs that implement full-power shock detection procedures.

Upon detecting any of these power state transitions or other conditions, at 525, EC 109 initiates a sideband communication session with the BMU (Battery Management Unit) 112. As described above, in embodiments, an EC 109 may be directly coupled to BMU 112 via a sideband management connection, such as an I2C bus connection, thus allowing these two components to remain in communication as long as both of these components remain powered. The EC 109 may issue a wake signal to the BMU 112 via this sideband bus connection and, at 530, may immediately trigger shock detection operations by the BMU 112 such as via one or more commands issued by EC 109 immediately following the wake signal.

As described above, BMU 112 may include a microcontroller or other logic unit that execute firmware instructions for monitoring battery conditions and in initiating certain battery operations. Upon detecting the wake signal and following command from EC 109, firmware instructions for operation of a sensor handler function are loaded for execution by the BMU 112, where these instructions implement shock detection operations to be conducted by the BMU, while drawing power from the batteries of the IHS during the pendency of the fully off power state. In some embodiments, the EC 109 may also transmit additional commands to the BMU 112 for use in configuration of the shock detection operations to be conducted by the BMU. For instance, additional commands provided by the EC 109 may specify sensor sensitivity and/or shock detection reporting threshold configurations for use by the sensor handler function of the BMU 112.

In some embodiments, commands provided by the EC 109 may specify inertial sensor settings to be used by the BMU 112, such as based on determinations by the EC of the available battery power that can be used during this fully off interval. For instance, if the EC 109 detects a fully charged battery at the transition to the fully off power state, the EC 109 may specify low sensor thresholds for shock detection by an inertial sensor, such as an accelerometer, thus resulting in more shock events being detected and reported by the sensor handler function of the BMU 112. If the EC 109 detects a low battery condition, the EC may specify high sensor thresholds for the inertial sensor, thus resulting in only large shock events being detected and reported by the BMU 112. In some embodiments, the EC 109 may base such sensor sensitivity setting based information indicating the IHS has been placed in a travel posture and is in transit, such that only significant shocks events should be detected.

Upon receipt of the commands to initiate shock detection procedures, at 535, the sensor handler function firmware of the BMU 112 is loaded and executed in order to initiate a sideband management connection with one or more inertial sensors of the IHS 100, such as an accelerometer, a gyroscope, or an Inertial Measurement Unit (IMU) of the IHS. As described above, in embodiments, BMU 112 may be directly coupled to one or more inertial sensor 415 via a sideband management connection, such as an I2C bus connection, thus allowing these two components to remain in communication as long as both of these components remain powered. The BMU 112 remains powered as long as sufficient power can be drawn from the batteries of the IHS. The inertial sensors 415 may remain powered for substantial periods using a capacitive power source, or may be powered via the power rail used to power the EC 109 in fully off states. Accordingly, in embodiments, the BMU 112 and inertial sensors 415 may support shock detection operation during fully off power states of substantial durations.

Using the sideband management connection, at 540, the sensor handler function of the BMU configures the shock detection operations to be implemented by the inertial sensor 415 during the fully off power state. These configurations may specify shock detection configurations, such as sensitivity settings for use by an inertial sensor 415, and may also specify reporting configurations for use by the inertial sensor, such as thresholds that trigger the inertial sensor to wake and generate a shock detection report. Configured in this manner, the inertial sensors 415 may operate for any length of time while monitoring for shock events.

With the inertial sensor 415 configured to detect and report shock events, at 545, the BMU 112 sensor handler function may initiate operations for transitioning the BMU to a low-power state. In this state, the BMU 112 sensor handler function monitors for signals from the EC 109 indicating the IHS is transitioning back to a power state that allows sensor hub 207 shock detection procedures to operate. In this low power state, BMU 112 sensor handler function also monitors for wake signal from the inertial sensor 415 on the sideband management bus. Upon detection of a shock event that satisfies the thresholds for reporting the event, at 550, the inertial sensor 415 begins capturing and recording shock data, such as repeated accelerometer readings. In response to the detected shock event, the firmware of the inertial sensor 415 also masters the sideband bus connection with the BMU 112 in order to transmit a wake signal to the BMU.

While in a low power state and listening on the sideband bus, at 555, the BMU 112 sensor handler function detects the wake signal issued by the inertial sensor 415 and resumes full power operation by drawing power from the batteries of the IHS. At 560, the BMU 112 sensor handler function resumes control of the sideband bus connection and transmits commands directing the inertial sensor 415 to transmit collected shock event data to the BMU via the sideband connection. In response, the inertial sensor 415 retrieve shock event data stored onboard and begin transmission of the data to the BMU 112 via the sideband bus connection.

The received shock event data is stored, at 565, by the BMU 112 sensor handler function in an onboard non-volatile memory. In some scenarios, the received shock event data may be stored locally by the BMU 112 sensor handler function without further transfer of the data during the fully off power state. As described, in some embodiments, the EC 109 may operate from a separate power rail from system processors, such as processors 101 and SoCs used in implementing a heterogenous computing platform 200. In such embodiments, the BMU 112 sensor handler function may issue a signal to the EC 109 indicating that a shock event has been detected and shock data has been stored by the BMU and is ready for transfer to the EC 109.

Via the sideband connection between these components, the shock data that is stored by the BMU 112 sensor handler function may be transmitted via the sideband bus connection to the EC 109. As described with regard to FIG. 4, EC 109 may include a sideband bus connections that may be operated by the EC 109 in accessing data storage provided by an NVMe partition 425 and may additionally or alternatively including an onboard NVRAM 420. Based on volumes of shock data collected by the BMU 112 and storage capacity available in each storage locations, the EC 109 may retrieve and store all of the reported shock data.

Once all shock data has been stored by the EC 109, and/or stored locally by the BMU 112, each of the components may revert to low power operations, with the inertial sensor 415 continuing to monitor for shock events that surpass the thresholds configured for use during the fully off power state. Any number of shock events may be detected, recorded and stored in this manner over any duration of time when, at 570, the IHS resumes powered operations. In some instances, the IHS may resume fully powered S0 operations.

In other instances, the IHS may boot to a standby state in anticipation of the user resuming active operation of the IHS.

Once the EC 109 has confirmed the IHS is fully operational such that shock detection operations provided by a processor 101 and/or sensor hub 207 are again operational, at 575, the EC retrieves the shock data from the stored locations and forwards the data to one or more administrative tools. Prior to transmission of the recorded shock data, the EC 109 may issue various notifications specifying the collected data and may be provided with instructions for transmission of the data. Also upon confirming the IHS is operational, EC 109 may issue a signal to the BMU 112 directing termination the sensor handler function, thus reverting the operation of the BMU according to existing capabilities.

In some instances, the shock data recorded by the BMU 112 during the fully off power state may correspond to a shock event that has resulted in damage to the IHS. Accordingly, in some embodiments, the EC 109 may transmit the recorded shock data to a technical support location using an network location stored by the EC for use in scenarios where the EC 109 detects a fault or error in booting the IHS as a result of the shock event. This data that is transmitted to the technical support network location may then be used in initiating diagnostic and remediation procedures for the IHS 100.

In some instances, the shock data recorded by the BMU 112 during the fully off power state may correspond to a shock event resulted in no damage to the IHS such that IHS boots normally. Accordingly, in some embodiments, the EC 109 may transmit the recorded shock data to the sensor hub 207 or other existing shock detection system in scenarios where the EC 109 detects normal booting of the IHS. This data may then be used by the sensor hub 207 in further training of existing shock event systems.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a one or more inertial sensors;
one or more processors and a memory coupled to, or integrated into, the processors, wherein the memory comprises program instructions that, upon execution by the processors, run an operating system of the IHS:
an Embedded Controller (EC) and a memory coupled to, or integrated into, the EC, wherein the memory comprises program instructions that, upon execution by the EC, cause the EC to:
   detect a transition to a low-power operating state by the one or more processors; and
   transmit a signal to a Battery Management Unit (BMU) of the IHS to initiate shock detection operations by the BMU; and
the BMU coupled to a battery of the IHS and a memory coupled to, or integrated into, the BMU, wherein the memory comprises program instructions that, upon execution by the BMU, cause the BMU to:
   initiate a sideband connection to a first of the inertial sensors upon receiving the signal to initiate shock detection; and
   collect shock event data from the first of the inertial sensors while the one or more processors are in the low-power operating state;
wherein the first inertial sensor wakes the BMU via the sideband connection between the BMU and the first inertial sensor upon the first inertial sensor detecting a shock event.

2. The IHS of claim 1, wherein the one or more inertial sensors comprises at least one of: an accelerometer, a gyroscope, and an Inertial Measurement Unit (IMU).

3. The IHS of claim 1, wherein the low-power operating state by the one or more processors comprises a fully-off state of the IHS.

4. The IHS of claim 3, wherein the fully-off state of the IHS comprise a G3 or S5 power state of the IHS.

5. The IHS of claim 1, wherein the low-power operating state by the one or more processors results from a fault or error.

6. The IHS of claim 1, wherein the low-power operating state by the one or more processors results from a user operation.

7. The IHS of claim 1, wherein the signal transmitted to the BMU to initiate shock detection operations by the BMU is transmitted via a sideband management connection between the EC and the BMU.

8. The IHS of claim 1, wherein, upon receipt of the wake signal, the BMU retrieves the shock event data collected by the first inertial sensor and transmits the shock event data to the EC.

9. The IHS of claim 8, wherein the shock event data transmitted to the EC is stored by the EC until the EC detects a transition out of the low-power operating state by the one or more processors.

10. The IHS of claim 1, wherein execution of instructions by the BMU further causes the BMU to, upon receiving the signal to initiate shock detection, load instructions for operation of a sensor handling function that is configured to interface with the first inertial sensor.

11. A method for shock detection by an Information Handling System (IHS), the method comprising:
   detecting a transition to a low-power operating state by the one or more processors of the IHS;
   transmitting, by an Embedded Controller (EC) of the IHS, a signal to a Battery Management Unit (BMU) of the IHS via a sideband connection in order to initiate shock detection operations by the BMU;

initiating, by the BMU, a sideband connection to an inertial sensor of the IHS upon receiving the signal to initiate shock detection; and collecting, by the BMU, shock event data from the inertial sensor while the one or more processors of the IHS are in the low-power operating state;

wherein the inertial sensor wakes the BMU via the sideband connection between the BMU and the inertial sensor upon the inertial sensor detecting a shock event.

12. The method of claim 11, wherein the inertial sensor comprises an accelerometer, a gyroscope, or an Inertial Measurement Unit (IMU).

13. The method of claim 11, wherein the low-power operating state by the one or more processors comprises a fully-off state of the IHS.

14. The method of claim 13, wherein the fully-off state of the IHS comprise a G3 or S5 power state of the IHS.

15. A non-transitory computer-readable storage device having instructions stored thereon, wherein execution of the instructions by an Embedded Controller (EC) of an IHS (Information Handling System) causes the EC to:

detect a transition to a low-power operating state by the one or more processors of the IHS;

transmit a signal to a Battery Management Unit (BMU) of the IHS via a sideband connection in order to initiate shock detection operations by the BMU, wherein in response to the signal the BMU initiates shock detection procedures through configuration of an inertial sensor of the IHS; and retrieve shock event data collected by the BMU from the inertial sensor while the one or more processors of the IHS are in the low-power operating state;

wherein the inertial sensor wakes the BMU via the sideband connection between the BMU and the inertial sensor upon the inertial sensor detecting a shock event.

16. The storage device of claim 15, wherein the inertial sensor comprises an accelerometer, a gyroscope, or an Inertial Measurement Unit (IMU).

17. The storage device of claim 15, wherein the low-power operating state by the one or more processors comprises a fully-off state of the IHS.

* * * * *